April 15, 1952     T. B. KEESLING     2,592,909
CONTAINER FEED MECHANISM
Filed Feb. 25, 1946     3 Sheets-Sheet 2
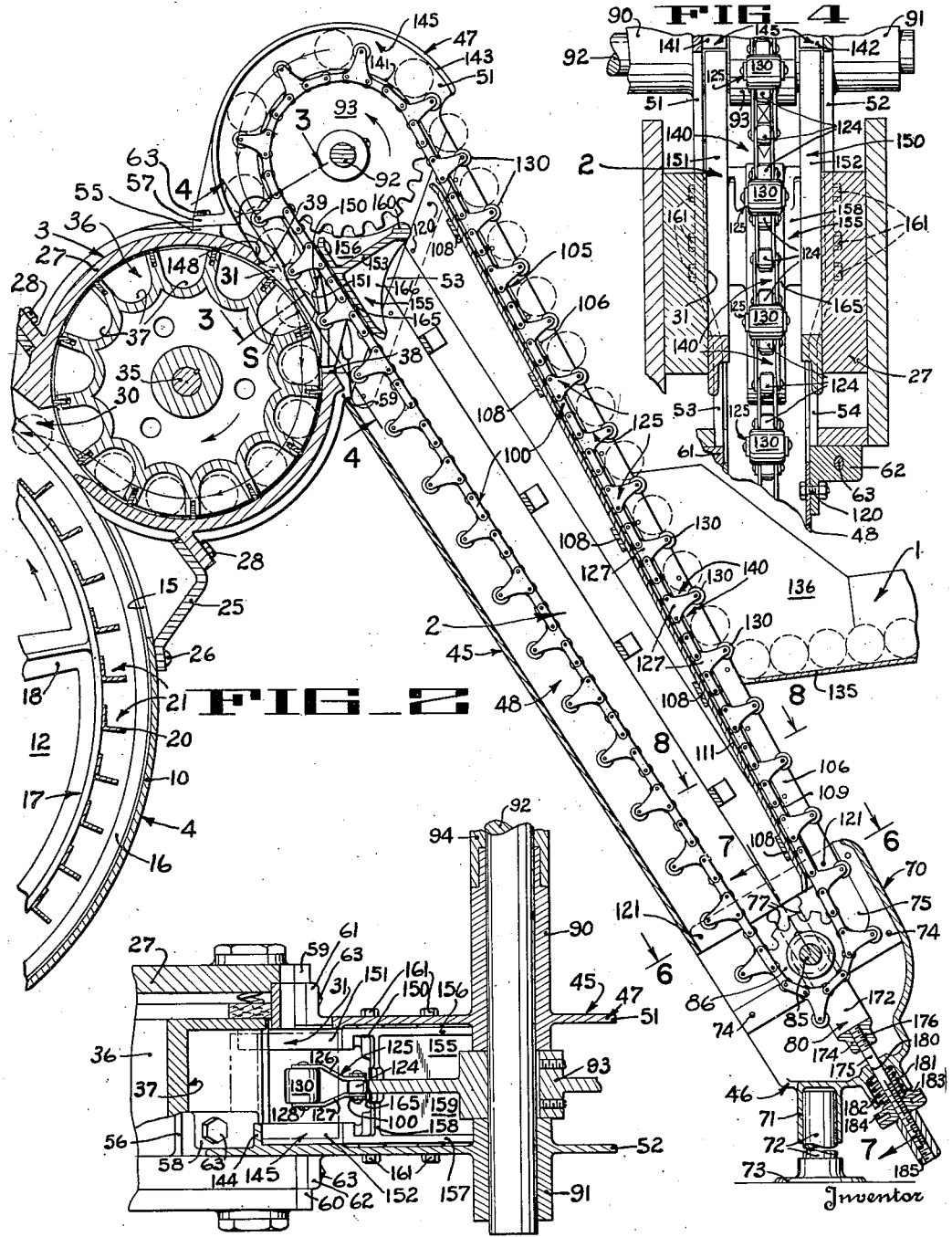
THOMAS B. KEESLING.
Inventor
By Philip A. Minnis
Attorney April 15, 1952 T. B. KEESLING 2,592,909
CONTAINER FEED MECHANISM
Filed Feb. 25, 1946 3 Sheets-Sheet 3
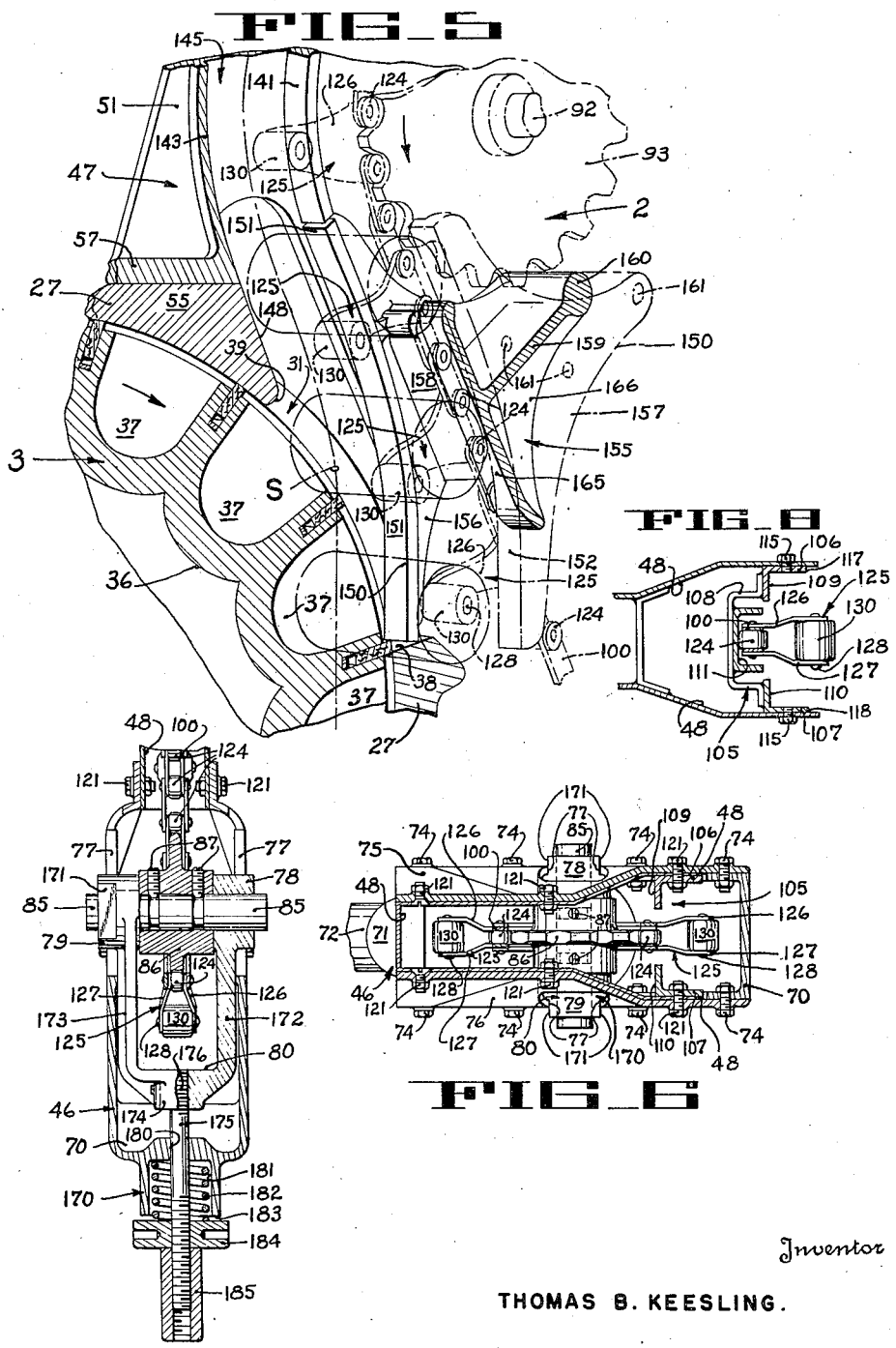
Inventor
THOMAS B. KEESLING.
By Philip A. Minnis.
Attorney Patented Apr. 15, 1952

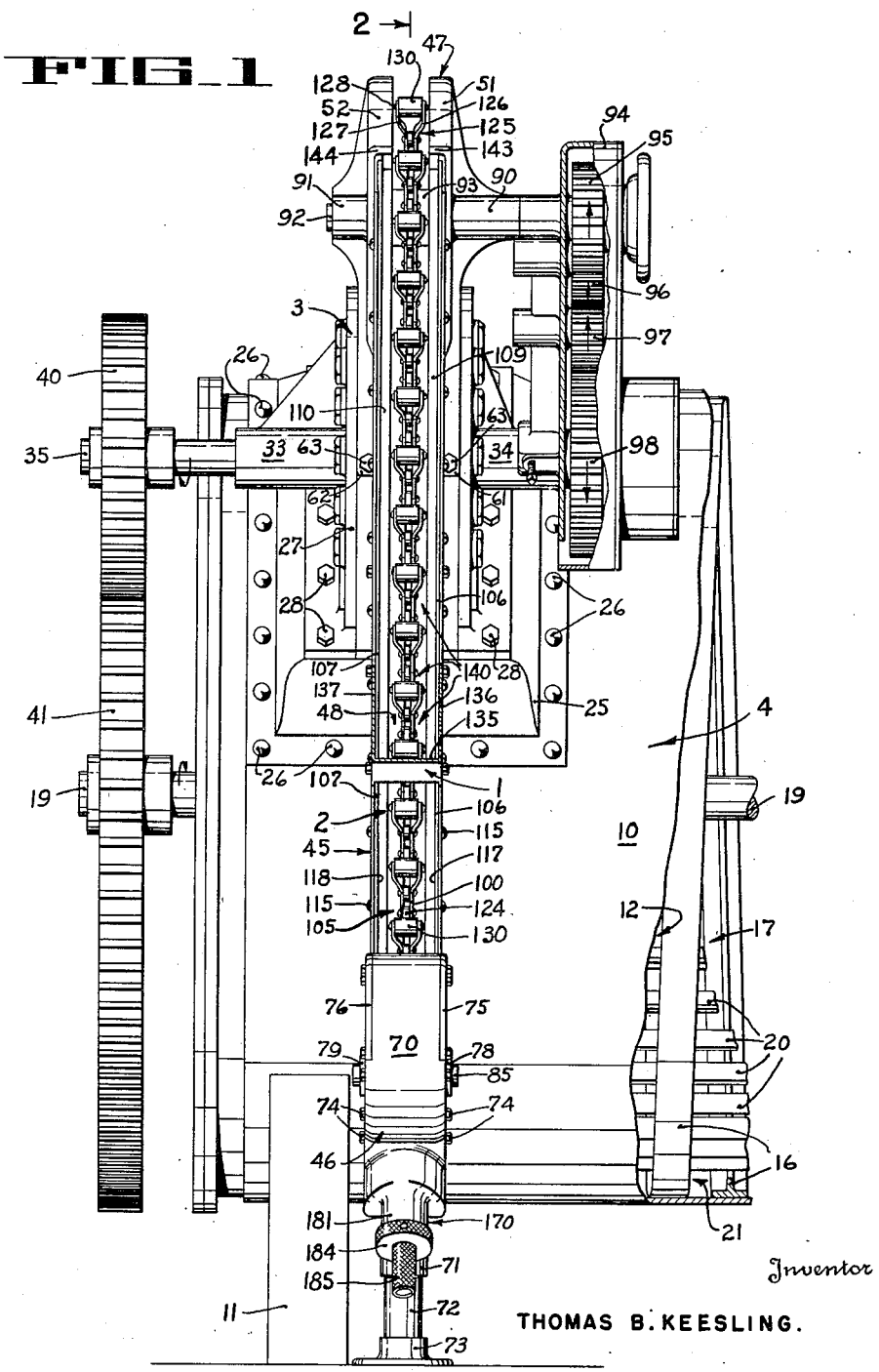

2,592,909

UNITED STATES PATENT OFFICE 2,592,909

CONTAINER FEED MECHANISM

Thomas B. Keesling, Campbell, Calif., assignor to Food Machinery and Chemical Corporation, a corporation of Delaware Application February 25, 1946, Serial No. 650,017

11 Claims. (Cl. 198—28)

This invention relates to apparatus for feeding articles, such as containers, and is particularly concerned with improvements in feed mechanism for continuous cookers, coolers, and the like.

Continuous cookers are provided with a rotary feed valve having an inlet for receiving containers from an elevator and for transferring the containers to the cooker. Heretofore, it has been common practice to either drop the containers from the elevator into the feed valve or to position the discharge reach of the elevator vertically adjacent the valve and to deflect the containers sidewise from the elevator into the valve.

When the containers are dropped from the elevator into the feed valve they are subjected to undue shock and are quite frequently damaged thereby, especially if glass containers are to be fed and furthermore the speed of such apparatus is necessarily limited to prevent jamming of the containers as they are transferred from the elevator to the feed valve.

In apparatus in which the containers are deflected sidewise from the elevator into the valve a greater speed is permissible. However, a certain speed of operation cannot be exceeded because otherwise the containers are likewise subject to jamming.

The present invention contemplates feeding the containers more directly and smoothly from an elevator to a feed valve by arranging the discharge reach of the elevator obliquely and tangentially relative to the feed valve and providing the feed valve with an inlet so disposed as to permit the reception of containers along a substantially vertical path in alignment with and tangentially disposed relative to the arcuate path of the containers through the valve. Consequently, the containers flow in a continuous unbroken path from the elevator to the feed valve so that a high speed of transfer of the containers from the elevator to the feed valve can be attained without jarring the containers or subjecting them to shock, which is very desirable especially if frangible containers such as glass jars are to be handled. It is furthermore apparent that the high speed of transfer of the containers permits a correspondingly faster operation of the cooker.

It is, therefore, one object of the present invention to provide an elevator mechanism for feeding containers to a continuous cooker at a maximum speed with a minimum of shock to the containers.

Another object is to provide a feed mechanism for feeding containers into a rotary valve along a path which is substantially in alignment with and vertically tangent relative to the arcuate path of the container through the valve.

Another object is to provide an elevator mechanism for rolling cylindrical containers along a confined path with a minimum of sliding or scraping so that the containers will not become marked or scratched.

Another object is to provide a mechanism for camming the containers from a feed elevator into a rotary receiver while permitting continuous rolling motion of the containers.

Another object is to provide an elevator mechanism for rolling cylindrical containers along a confined passage and for rollingly deflecting them out of such passage into a substantially vertical path merging into the arcuate path of a rotary receiver.

Another object is to provide a stabilizer for a chain conveyor having a discharge section overlying the inlet of a rotary receiver to thereby dampen vibration of the chain conveyor and limit its movement outwardly relative to the inlet.

Another object is to provide a safety unit for a spring tensioned chain conveyor having a discharge reach above the inlet of a rotary receiver for preventing drooping of the chain into the receiver in the event of spring breakage.

Other objects and advantages of the present invention will appear more fully from the following description in connection with the drawings in which:

Fig. 1 is an elevation of a portion of a cooker showing the feed valve thereof and the elevator of the present invention associated therewith.

Fig. 2 is a section of Fig. 1 taken along line 2—2 thereof.

Fig. 3 is a section of a portion of Fig. 2 taken along line 3—3 thereof.

Fig. 4 is a section of a portion of Fig. 2 taken along line 4—4 thereof.

Fig. 5 is a fragmentary perspective view of the discharge end of the elevator, certain parts being shown in section.

Fig. 6 is a transverse section of the elevator and the chain tensioning device employed in connection therewith; the view being taken along line 6—6 in Fig. 2.

Fig. 7 is a longitudinal section, partially in elevation, of the chain tensioning device taken along line 7—7 in Fig. 2.

Fig. 8 is a section through the conveyor track taken along line 8—8 in Fig. 2.

The present invention has been illustrated in connection with a container feed mechanism for a continuous pressure cooker. Such container feed mechanism in general comprises a feed chute 1, an elevator 2 and a feed valve 3 associated with the pressure cooker 4.

The pressure cooker 4 which has been partially illustrated herein may be of any conventional construction such as, for instance, shown in U. S. Letters Patent No. Re. 15,334, dated April 11, 1922, to A. R. Thompson. Continuous pressure cookers of this type comprise a cylindrical shell 10 closed at its ends to provide a pressure treating chamber 12. The shell 10 has an inlet opening 15 for admitting the containers presented thereto by the feed valve 3 into the chamber 12 and a discharge opening provided with a discharge valve for discharging the containers therefrom. The discharge opening and discharge valve, which are similar to the inlet opening and feed valve, have not been illustrated herein.

Disposed within the chamber 12 is a T-shaped helically convoluted guide track 16 secured to and extending around the inside wall of the shell 10 from the inlet opening 15 to the discharge opening thereof so as to form a spiral runway for guiding containers through the treating chamber 12. The containers are advanced along the runway by means of a rotary reel 17 comprising a plurality of spider wheels 18 secured to a central shaft 19 and provided with a plurality of angle iron pusher bars 20 on their periphery and longitudinally disposed relative to the shell so as to form in conjunction with the spiral runway a series of container supporting pockets 21.

Secured to the shell 10 adjacent the inlet opening 15 by means of rivets 26 is a casting 25 to which the housing 27 of the rotary feed valve 3 is secured by bolts 28. The periphery of the housing 27 has a valve outlet opening 30 adjacent to and communicating with the inlet opening 15 of the treating chamber 12 and also has a valve inlet opening 31 spaced therefrom exteriorly of the chamber. The housing 27 is provided with pressure tight bearings 33 and 34 at its sides and rotatably mounted within the same is a shaft 35 disposed parallel to the drive shaft 19. Within the housing 27 and keyed to the shaft 35 for rotation therewith is a rotary turret 36 having a plurality of peripheral pockets 37 sealed with respect to each other. Each pocket is adapted to receive an individual container for transferring the same from the valve inlet 31 to the valve outlet 30.

The shaft 35 extends beyond one end of the shell 10 (Fig. 1) and has a gear 40 keyed thereto. The gear 40 meshes with a bull gear 41 keyed to the reel drive shaft 19 so that the rotary turret 36 is driven in synchronism with the reel 17. As seen in Fig. 2, the reel 17 is rotated counterclockwise and the turret 36 clockwise. The reel pockets 21 are thereby caused to register with the turret pockets 37 as they pass the communicating inlet and outlet openings 15 and 30 of the chamber and feed valve, respectively. The lower margin 38 of the valve inlet opening 31 is located horizontally opposite the axis of the turret. The upper margin 39 of the opening 31 is spaced peripherally from the lower margin 38 so as to permit containers to enter the feed valve from above, that is, along a path which is substantially vertically tangent to the path the containers will travel while in the turret pockets 37.

The elevator 2 comprises a housing 45 having its lower end supported by a pedestal 46 and its upper end formed as a head-casting 47 supported by the housing 27 of the rotary feed valve 3. The elevator housing 45 is provided with a trough like closure 48 intermediate the pedestal and head-casting which forms a guard for moving parts of the elevator as will later become apparent.

The head-casting 47 is formed by two circular shaped side plates 51 and 52 each having a downwardly extending section 53 and 54, respectively, (Figs. 2 and 4). Adjacent the upper margin of the inlet opening 31 each side of the valve housing 27 is provided with a boss 55 and 56 (Figs. 3 and 5). Flanges 57 and 58 extend horizontally from the respective side plates 51 and 52 and rest upon the bosses 55 and 56, respectively. Each adjacent side of the valve housing 27 at the lower margin of the inlet opening 31 is likewise provided with a boss 59 and 60. Each side plate 51 and 52 is provided with a vertical flange 61 and 62, respectively, (Figs. 1 and 4) which rest against the bosses 59 and 60, respectively.

Each of the flanges 57, 58 and 61, 62 of the side plates are secured to the respective bosses 55, 56 and 59, 60 by bolts 63. The side plates 51 and 52 are thereby disposed with their inner faces flush with the end walls of the turret pockets 37, as seen in Fig. 3, so as to permit passage of containers lengthwise therebetween.

The pedestal 46 comprises a substantially U-shaped casting 70 having a downwardly extending sleeve 71 which fits over a standard 72 having a foot portion 73. Bolted, as shown at 74 (Figs. 1 and 6), to the sides of the casting 70 are a pair of side plates 75 and 76 each having a guide slot 77 formed therein. Arranged in these slots for sliding movement therealong are floating bearings 78 and 79 formed as a part of a yoke 80 later to be more fully described. A shaft 85 is supported for rotation in the floating bearings 78 and 79 and has a sprocket 86 secured thereto by set screws 87, as shown in Figs. 6 and 7.

The circular section of each side plate 51 and 52 is provided with a laterally projecting bearing 90 and 91, respectively (Figs. 1 and 3). An elevator drive shaft 92 is supported in the bearings 90 and 91 for rotation about an axis parallel to the shafts 19 and 35. A drive sprocket 93 is keyed to the shaft 92 for rotation therewith between the side plates 51 and 52. One end of the drive shaft 92 extends from the head-casting into a gear box 94 (Fig. 1) and a gear 95 is secured to the shaft 92 within the gear box. The gear 95 meshes with a gear 96 in a train of gears including gears 97 and 98, the latter of which is secured to one end of the drive shaft 35 which also extends into the gear box.

Trained around the sprockets 93 and 86 is an endless elevator chain 100. The lower reach of chain 100 extends substantially parallel to a chord line struck across the periphery of the housing 27 from upper to lower margins 39 and 38, respectively, of the inlet opening 31. As best seen in Fig. 2, the lower reach of the chain 100 is spaced from the inlet opening 31 to permit the passage of containers between the chain and turret housing 27. The upper reach of the elevator chain 100 is also inclined and is supported parallel to an elevator track 105, as shown in Figs. 2, 2, and 8. The elevator track 105 comprises two angle irons 106 and 107 spaced from each other by U straps 108. The straps 108 are welded to the lower faces of inwardly extending flanges 109 and 110 of the angle irons and have a chain supporting channel 111 welded to their recessed portion, as shown in Fig. 8.

The trough-like closure 48, mentioned above, has its open upper edges secured by bolts 115 to the outer faces of vertical flanges 117 and 118 of the angle irons 106 and 107, respectively. The upper end of the closure 48 fits between the side plates 51 and 52 and each side of the closure as well as the upper ends of the angles 106 and 107 is secured to the respective side plates 51 and 52 by machine bolts 120. The lower end of the closure 48 fits between the side plates 75 and 76 which are secured to the casting 70 of the pedestal 46. Each side of the closure 48 as well as the lower ends of the angles 106 and 107 is secured to the respective side plates 75 and 76 by machine bolts 121. The elevator track 105 is thereby fixed between the pedestal and head-casting and the closure 48 provides a chain guard therebetween.

The elevator of the present invention employs but a single endless chain and the spacers between the respective links thereof are rollers 124 which ride upon the channel 111 as they travel along the same. Every third link of the chain 100 is provided with a flight 125 comprising outwardly extending brackets 126 and 127 each flared laterally with respect to the center of the chain, as shown in Figs. 3, 6, 7, and 8. A pin 128 extends between the upper ends of each pair of brackets 126 and 127 and supports a roller 130 adapted to engage a container for pushing the latter upwardly and over the drive sprocket 93.

The containers are fed onto the upper reach of the elevator chain 100 by the gravity chute 1, hereinbefore mentioned, as seen in Fig. 2. The gravity chute 1 has a lower wall 135 terminating adjacent the elevator chain and also has side walls 136 and 137 secured to the sides of the closure 48 to support the discharge end of the gravity chute adjacent the elevator chain.

The containers gravitate along chute 1 in a steady stream toward the elevator and fall one after another into successive pockets 140 formed between the pusher rollers 130 of the chain 100. The containers fall into the respective pockets 140 and are supported on the inwardly extending flanges 109 and 110 of the elevator track 105. The upper reach of the chain is disposed at such an angle as to assure that each container will be supported in its respective pocket 140 as the containers are elevated.

The pusher rollers 130 are so disposed relative to the longitudinal axes of the respective containers engaged thereby that the periphery of each roller engages the periphery of a container, i. e., the rollers have single line contact with the respective containers. Therefore, while the containers are pushed up the inclined track 105 they are free to roll upon the inwardly extending flanges 109 and 110 thereof and also are free to rotate with respect to the pusher rollers 130. Accordingly, scraping of the containers along the track 105 and against the pusher rollers 130 is minimized and the containers are elevated with the least possible resistance to the drive mechanism for the chain 100.

The circular sections 51 and 52 of the headcasting 47 are provided with inwardly extending flanges 141 and 142, respectively. These flanges 141 and 142 are tangent to the flanges 109 and 110 of the track 105 and form a continuation thereof. The circular sections 51 and 52 are also provided, adjacent their peripheries, with inwardly extending flanges 143 and 144, respectively, and the spaces between flanges 141—143 and 142—144 provide a track 145 around the sprocket 93. Therefore, as the containers leave the upper end of the track 105 they pass into the track 145 and are maintained within their respective pockets 140 as the chain 100 travels around the sprocket 93.

As the chain 100 begins its descending reach the pockets 140 are inverted so that the containers will normally gravitate toward the feed valve 3. The valve housing 27 is provided with inclined surfaces 148 above the upper margin 39 of the inlet 31. These surfaces 148 are tangent to the ends of the flanges 143—144 at the periphery of the circular sections 51 and 52 and are parallel to the normal pitch line of the descending reach of the chain 100. Consequently, the containers are maintained within the pockets 140 until they pass the upper margin 39 of the inlet 31 and thereafter are free to gravitate toward the turret pockets 37 as the chain moves past the inlet 31. Although the containers reverse their direction of rotation as they begin to descend toward the inlet 31 due to their engagement with the flanges 143, 144 and surfaces 148, the pusher rollers 130 are free to rotate in either direction and, therefore, marring or scratching of the containers is minimized.

The range of speed of the elevator is suited to the capacity of the cooker 4 or whatever other apparatus the elevator may be employed with. It may be desirable to operate the apparatus relatively slow in which case the speed of the elevator is correspondingly reduced, for instance, to its minimum speed. In such case, the containers conveyed over the drive sprocket 93 roll by gravity along the descending portion of track 145 into contact with the leading roller 130 of their respective pockets 140. Such containers also become supported on and roll along the outside flanges 143 and 144 of the container track 145 and subsequently roll onto the inclined surfaces 148 (Fig. 2) of the valve housing just above the inlet opening 31 thereof.

Since the elevator chain 100 is driven by the drive sprocket 93, drive shaft 92 and train of gears 95, 96, 97, and 98, in synchronism with the rotary turret 36, the pockets 37 of the turret register with successive pockets 140 of the elevator chain as they pass the inlet 31. Consequently, as the containers pass the upper margin 39 of the inlet, the containers begin to gravitate into the turret pockets 37 in registration therewith. Since the pockets 140 and 37 are in continuous motion in a downward direction while the containers are being transferred from one to the other, the containers follow a gradually curved trajectory and eventually travel in a vertical path. Consequently, the containers, while being transferred from chain to turret, become supported upon the leading wall of the turret pocket when it is in an inclined position. However, this leading wall is moving at the same speed as the chain and container. Therefore, although a container begins to roll toward the bottom of the turret pocket by reason of the inclined position of the leading wall thereof, the inclination of this wall rapidly diminishes as the container gravitates toward the bottom of the pocket. In other words, by the time the container reaches the bottom of the pocket the latter is substantially adjacent the lower margin 38 of the inlet 31 and the container in effect has followed a path which is substantially vertical and tangent to the path the containers will now follow while in the valve.

Since the leading wall of the turret pocket is in motion as the containers roll toward the bottom thereof the containers are not subjected to excessive shock as they would be if they fell directly toward the bottom of a pocket. Furthermore, the containers are transferred from the conveyor to the valve without any substantial deviation in their path of travel and, therefore, flow in an unbroken path directly into the moving pockets 37.

The present apparatus is equally well adapted to be operated at a high speed in which case the containers conveyed over the drive sprocket 93 are substantially pushed in a steady stream by the respective pusher rollers 130. While the containers are thus pushed they are guided by the arcuate track 145 and subsequently descend toward the inlet opening 31 of the valve housing. In order to assure that containers fed at such speed will transfer from the chain pockets 140 to the turret pockets 37 a stripper guide 150 is provided, as best seen in Fig. 5.

The stripper guide comprises a pair of stripper rails 151 and 152 spaced apart and in alignment with the respective inside flanges 141 and 142 on the inner faces of the side plates 51 and 52. The rails 151 and 152 are formed as an integral part of a casting 155 and each of them is reinforced by a triangular shaped web 156 and 157, respectively, extending rearwardly from the rails. The webs 156 and 157 are joined by a web 158 extending therebetween substantially parallel to the discharge reach of the endless chain 100. The webs 156 and 157 are further joined by a web 159 extending normal to the web 158 and rearwardly therefrom to the apex of the triangular webs where the latter are joined by a transverse portion 160.

The casting 155 is mounted between the side plates 51 and 52 and is secured in place opposite the inlet 31 by bolts 161 (Figs. 3 and 4). The upper end of each rail 151 and 152 abuts against the lower end of the inside flanges 141 and 142, respectively, and the descending reach of the chain 100 passes between the rails. The rails are curved to guide the containers out of the chain pockets 140 and into a substantially vertical path which is tangent to the path the containers will travel while in the turret 36. The lower ends of the stripper rails 151 and 152 terminate adjacent the lower margin 38 of the inlet 31, as shown in Figs. 2 and 5.

From the foregoing, it is apparent that when the containers are conveyed toward the inlet 31, their outer ends engage the gradually curved faces of the rails 151 and 152. Consequently, the containers are guided by the rails 151 and 152 out of the pockets 140 and vertically through the inlet and into the respective turret pockets 37. Since the pusher rollers 130 are free to rotate relative to the containers, the latter are free to roll with respect to the rails 151 and 152. Therefore, as the rollers 130 move toward the stripper rails, the containers are not squeezed between the rollers and rails but rather are free to move out of the pockets 140 due to the free rotation of the oncoming pusher rollers 130. In other words, the pusher rollers ride down the periphery of the containers and do not resist the lateral movement of the containers as they ride down the curved rails 151 and 152.

The apparatus may well be operated at any speed between the maximum and minimum speeds hereinbefore explained. In such cases, as the containers arrive at the inlet opening 31, they are influenced by both the force of gravity and the effect of the stripper 150. In some instances the speed of the chain 100 may be such as to carry the containers slightly beyond the inclined surfaces 148 of the housing before the containers begin to gravitate toward the valve. However, such containers engage the lower ends of the stripper rails 151 and 152 and are thereby deflected out of the chain pockets 140 and into the turret pockets 37.

In other instances the speed of the chain 100 will be such as to permit the containers to begin to gravitate out of the pockets 140 as soon as they leave the inclined surfaces 148. However, at an intermediate speed, the containers will follow a sinuous path generally indicated by the letter S in Fig. 5. This sinuous path merges into a substantially vertical path terminating into a curved path as the containers travel through the valve.

Irrespective of the speed at which the apparatus feeds the containers they are transferred from the chain pockets 140 to the turret pockets 37 without any substantial deviation from the vertical path. Thus the containers are handled smoothly and without jarring or shocking the same.

It may sometimes happen that containers rebound from the outside flanges 143 and 144 toward the chain pockets 140 as the containers approach the inlet opening 31. Consequently, without the stripper guide 150 such containers would be carried beyond the desired path and might become jammed between the lower margin of the inlet opening 31 and the pusher roller 130 and would, therefore, be crushed or damaged due to shock so that they would not withstand the cooking pressure to which they are subsequently subjected. However, containers that rebound as aforesaid are positively deflected from the chain pockets into the turret pockets by the stripper 150 and damage to the containers is, therefore, avoided.

The lower reach of the chain 100 will normally hang in a slight catenary curve and when operating will vibrate relative to the normal pitch line between sprockets 93 and 86. As seen in Fig. 2, the stripper guide casting 155 is provided with a stabilizer shoe 165 which extends the length of web 158, parallel to the lower reach of the chain 100 and opposite the inlet 31 of the valve. This shoe 165 is so positioned that the spacer rollers 124 of the chain 100 will normally engage the same when the chain is on its pitch line. Consequently, as the links of the elevator chain 100 leave the drive sprocket 93 their spacer rollers 124 engage the shoe 165 and the normal vibratory action of the chain is accordingly minimized.

The maintenance of the chain on the normal pitch line thereof as the containers flow into the turret pocket is very important. It is apparent that movement of the chain outwardly from the inlet opening is limited by the shoe 165. The chain, however, tends to droop toward the opening 31 and therefore the chain must be maintained at a proper tenseness between the two sprockets 93 and 86. This is essential, otherwise the pusher rollers 130 are likely to extend into the opening 31 and are liable to become caught on the turret or on the lower margin 38 of the inlet 31.

In order to maintain the elevator chain under tension the floating sprocket 86 is associated with a tension carriage 170 (Figs. 6 and 7). As hereinbefore explained, the sprocket 86 is secured to a shaft 85 having its ends rotatably mounted in bearings 78 and 79 formed as a part of the yoke 80. These bearings have parallel faces 171 and fit into the respective guide slots 77 for sliding movement longitudinally with respect to the elevator housing 45. The yoke 80 has legs 172 and 173 extending downwardly along the longitudinal axis of the housing 45 and has a threaded boss 174 at its bight. A screw 175 has one end threaded into the threaded boss 174 of the yoke and is secured thereto by a tapered pin 176 (Fig. 7.) The screw 175 also extends downwardly along the longitudinal axis of the elevator housing and fits through an aperture 180 in the bottom of the casting 70 adjacent the standard 72.

A cylindrical cup 181 is formed concentric to the aperture 180 on the underside of the casting 70 and a compression spring 182 is arranged in this cup 181 and around the shank of the screw 175. The spring 182 normally extends beyond the rim 183 of the cup 181 and is compressed by an adjusting nut 184 which is threaded onto the screw 175. The spring 182 in the present instance is of a construction calculated to exert approximately 340 pounds' pressure when compressed by the adjusting nut 184 to a length disposing the outer end of the spring approximately ⅛ of an inch from the rim 183 of the cup 181. The nut 184 is secured in its position of adjustment by a locking sleeve 185 threaded onto the end of the screw 175 to tightly engage and lock the nut 184 on the threads of the screw.

By the foregoing arrangement the elevator chain 100 is properly tightened and any manufacturing tolerances, i. e., variations in link length or the like, are taken up by the spring 182. Consequently, as the chain travels around the sprockets 93 and 86, a pulsation of the floating sprocket is permitted. In other words, the bearings 78 and 79 slide in the slots 77 and the yoke 80 is constantly urged downwardly by the compression spring 182 to keep the sprocket 86 tightly against the endless chain 100.

As the chain 100 and sprockets 93 and 86 wear due to constant running, the floating sprocket 86 is free to move by the influence of the compression spring 182. The compression spring will urge the yoke, its floating bearings and the sprocket 86 longitudinally away from the drive sprocket 93 and maintain the chain 100 under tension. However, when wear of the chain and sprockets is thus compensated for, the adjusting nut 184 becomes spaced further from the rim 183 of the cup 181 than it was in its original setting and the compression of the spring 182 will accordingly be reduced. Therefore, it becomes necessary to readjust the nut 184 back into the predetermined spaced relation with respect to the rim 183 in order to obtain the desired tension of the elevator chain as hereinbefore explained.

In addition to maintaining a proper tension on the elevator chain 100 the relationship of the adjusting nut 184 to the rim 183 of the cup 181 provides a safety feature. Should the spring 182 break or otherwise fail to bear against the nut 184 and thereby release the tension of the chain 100, the adjusting nut 184 will abut against the rim 183 of the cup. The floating bearings 78 and 79 and sprocket 86 are thereby prevented from sliding to the upper end of the slots 77. Therefore, the floating bearings can only move upwardly a limited distance dependent upon the distance of the adjusting nut from the rim 183 of the cup and accordingly excessive lobing of the chain is prevented. By thus preventing excessive lobing or drooping of the chain, the pusher rollers 130 are prevented from entering the inlet opening 31 of the feed valve. Therefore, the rollers 130 will not extend into the path of the turret pockets 37 and jamming of the rotary turret 36 as the latter rotates within the housing 27 is thereby prevented. Moreover, the rollers 130 are also thereby prevented from hooking onto the lower margin 38 of the inlet 31 and excessive damage to the apparatus avoided.

While I have described a particular embodiment of the present invention, it will be understood that various changes and modifications may be made without departing from the spirit of the invention. I, therefore, do not limit myself to the specific arrangement disclosed but desire to avail myself of such modifications and alterations as come within the scope of the appended claims.

Having thus described my invention, what I claim as new and desire to protect by Letters Patent is:

1. An elevator mechanism for feeding cans to a rotary valve having an inlet permitting the entrance of the cans along a path which is substantially vertically tangent to the path the cans will travel while in said valve, comprising an endless chain conveyor having a sprocket rotatably mounted for movably supporting the endless chain thereof with its descending reach extending tangentially across said inlet and midway the sides thereof, a trackway associated with said chain conveyor for supporting cans transversely of said chain, means for deflecting cans out of said trackway and into said inlet, said chain having arms extending into said trackway and for passage between said deflecting means at spaced intervals to provide can receiving pockets, said arms having pusher rollers supported thereon transversely of said trackway for rollingly engaging the periphery of a can and to roll said can along said trackway and said deflecting means toward said inlet for gravitation thereinto along said substantially vertically tangent path.

2. An elevator mechanism for feeding cans to a rotary valve having an inlet permitting entrance of cans along a path which is substantially vertically tangent to the path the cans will travel while in said valve, comprising an endless single chain conveyor having sprockets for movably supporting said chain with its descending reach extending chordally across said inlet, a trackway associated with said chain conveyor for supporting cans transversely thereof, said chain having flights at spaced intervals to provide can receiving pockets therealong for moving cans in spaced relation along said trackway, said flights each supporting a pusher roller with its periphery adapted to have line contact with the periphery of the cans in the respective pockets for rolling the cans along said trackway without marring the cans, said chain having a spring actuated tension device associated therewith for maintaining the chain under a predetermined spring load, and means associated with said tension device for limiting movement thereof out of tensioning engagement with said chain due to spring breakage to thereby prevent lobing of said chain toward said inlet and entry of said pusher roller into the rotary valve.

3. An elevator mechanism for feeding cans to a rotary valve having an inlet permitting entrance of cans along a path which is substantially vertically tangent to the path the cans will travel while in said valve, comprising an endless single chain conveyor having sprockets for movably supporting said chain with its descending reach extending across said inlet, a trackway associated with said chain conveyor for supporting cans transversely thereof, said chain having flights at spaced intervals to provide can receiving pockets therealong for moving cans in spaced relation along said trackway, stripper means disposed across the path of movement of the cans along said trackway opposite the inlet for deflecting the cans out of said pockets along said substantially vertically tangent path, said flights each supporting a pusher roller transversely of said trackway for rollingly engaging the cans in the respective pockets whereby the cans are free to roll along said trackway and relative to said stripper means without marring the cans.

4. An elevator mechanism for feeding cans to a rotary valve having an inlet permitting entrance of cans along a path which is substantially vertically tangent to the path the cans will travel while in said valve, comprising an endless single chain conveyor having sprockets for movably supporting said chain with its descending reach extending chordally across said inlet, a trackway associated with said chain conveyor for supporting cans transversely thereof, said chain having flights at spaced intervals to provide can receiving pockets therealong for moving cans in spaced relation along said trackway, stripper means disposed across the path of movement of said cans along said trackway opposite the inlet for deflecting the cans out of said pockets along said substantially vertically tangent path, said flights each supporting a pusher roller transversely with its axis parallel to the axis of a can in said trackway for rollingly engaging the cans in the respective pockets whereby the cans are free to roll along said trackway and said stripper means without marring the cans, and means for engaging the chain opposite the inlet for stabilizing said chain as the cans are deflected from said trackway by the combined action of said pusher rollers and said stripper means.

5. An elevator mechanism for feeding cans to a rotary valve having an inlet permitting entrance of cans along a path which is substantially vertically tangent to the path the cans will travel while in said valve, comprising an endless conveyor having a chain and sprockets for movably supporting said chain with its descending reach extending chordally across said inlet, a trackway associated with said conveyor for supporting cans transversely thereof, said chain having flights at spaced intervals to provide can receiving pockets therealong for moving cans in spaced relation along said trackway, stripper means disposed transversely of said trackway opposite said inlet for deflecting the cans out of said pockets along said substantially vertically tangent path, said flights each supporting a pusher roller with its periphery adapted to have line contact with the periphery of the cans in the respective pockets for rolling the cans along said trackway and said stripper means without marring the cans, said conveyor having a spring urged tension device associated therewith for maintaining the chain under a predetermined spring load, and means associated with said tension device for limiting movement thereof out of tensioning engagement with said chain due to spring breakage to thereby prevent lobing of said chain toward said inlet and entry of said pusher rollers into the rotary valve.

6. An apparatus for feeding cans to a rotary feed valve including a housing having an inlet for admitting cans to said valve along a path which is vertically tangent to the path the containers travel while in the same, comprising in combination a driven sprocket arranged above said inlet and a floating sprocket therebelow, a can track inclined toward said driven sprocket, around the upper periphery of the same and downwardly therefrom toward said inlet, a single endless chain arranged on said sprockets and having flights extending into the can track for receiving and spacing cans for movement therealong toward said inlet, means for supplying cylindrical cans to the inclined can track with their long axes transversely disposed therein for rolling engagement therewith, stripper means on either side of said chain opposite said inlet for guiding the cans out of the can track along said substantially vertically tangent path, means for yieldingly urging said floating sprocket toward said chain to maintain the latter under a predetermined tension thereby preventing lobing of the chain in the region of said inlet and entry of said flights into said rotary feed valve, and means for limiting movement of said floating sprocket away from said chain in the event of failure of said yielding means.

7. In an apparatus for feeding cans to a rotary feed valve including a housing having an inlet for admitting cans to said valve from above, the combination therewith of a driven sprocket and a floating sprocket, a can track inclined toward said driven sprocket, around the upper periphery of the same and downwardly therefrom toward said inlet, a single endless chain arranged on said sprockets and having flights extending into the can track for moving cans therealong, means for supplying cylindrical cans to the inclined can track with their long axes transversely disposed therein, said flights each having a pusher roller in line contact with the periphery of a can in said track for rolling engagement therewith, stripper means on either side of said chain opposite said inlet for guiding the cans out of the can track and into said inlet, means between the stripper means for stabilizing the chain as the cans are urged against said stripper means by said pusher rollers, means for yieldingly urging said floating sprocket toward said chain to maintain the latter under a predetermined tension, and means for limiting movement of said floating sprocket away from said chain in the event of failure of said urging means to thereby prevent the entry of said pusher rollers into said inlet.

8. An apparatus for feeding cans to a rotary feed valve including an annular housing provided with an inlet disposed to receive cans from above, comprising a conveyor extending chordally past said inlet, including a chain associated with said conveyor and having flights for moving cans toward said inlet for gravitation thereinto, a floating sprocket, means mounting said sprocket for movement toward and from said chain, a spring associated with said mounting means for urging the latter and said sprocket toward said chain to thereby maintain the chain under a predetermined tension, and means for limiting movement of said mounting means away from said chain in the event of spring breakage to thereby maintain said sprocket in engagement with said chain for preventing lobing of the chain at said inlet and entry of said flights into said housing.

9. A container feed mechanism comprising a turret rotatable on a substantially horizontal axis and having a plurality of peripheral pockets for the respective reception of individual containers; a housing encasing said turret and having a peripheral inlet opening at one side thereof disposed above a horizontal plane extending through the turret axis for admission of containers into said turret pockets; and a conveyor having a plurality of pockets for the respective reception of individual containers; said conveyor including an upwardly extending inclined reach wherein said conveyor pockets hold and transport said containers; said upwardly extending reach connecting with a downwardly inclined inverted conveyor reach extending tangentially across said turret inlet opening so that containers within the pockets of said downwardly inclined conveyor reach gravitate into said turret pockets along a path disposed substantially vertically tangent to said turret; whereby to effect a gradual and smooth transfer of the containers from said conveyor to said turret during their conjoint movement without shock and damage to the containers.

10. A container feed mechanism comprising a turret rotatable on a substantially horizontal axis and having a plurality of peripheral pockets for the respective reception of individual containers; a housing enclosing said turret and having a peripheral inlet opening at one side thereof disposed above a horizontal plane extending through the turret axis for admission of containers into said turret pockets; a conveyor having a plurality of pockets for the respective reception of individual containers; said conveyor including an upwardly extending inclined reach wherein said conveyor pockets hold and transport said containers; said upwardly extending reach connecting with a downwardly inclined inverted conveyor reach extending tangentially across said turret inlet opening so that containers within the pockets of said downwardly inclined conveyor reach gravitate into said turret pockets along a path disposed substantially vertically tangent to said turret; and means for synchronously driving said conveyor and said turret to establish successive registry of said conveyor and turret pockets as they pass said turret inlet opening; whereby to effect a gradual and smooth transfer of the containers from said conveyor to said turret during their conjoint movement without shock and damage to the containers.

11. A container feed mechanism comprising a turret rotatable on a substantially horizontal axis and having a plurality of peripheral pockets for the respective reception of individual containers; a housing enclosing said turret and having a peripheral inlet opening at one side thereof disposed above a horizontal plane extending through the turret axis for admission of containers into said turret pockets; a conveyor having a plurality of pockets for the respective reception of individual containers; said conveyor including an upwardly extending inclined reach wherein said conveyor pockets hold and transport said containers toward said turret; said upwardly extending conveyor reach connecting with a downwardly inclined inverted conveyor reach extending tangentially across said inlet opening of said turret so that containers within the pockets of said downwardly inclined conveyor reach gravitate into said turret pockets along a path disposed substantially vertically tangent to said turret; means adjacent said turret opening for deflecting containers from said downwardly inclined conveyor reach into said turret opening; and means for synchronously driving said conveyor and turret to establish successive registry of said conveyor and turret pockets as they pass the inlet opening of said turret; whereby to effect a gradual and smooth transfer of the containers from said conveyor to said turret during their conjoint movement without shock and damage to the containers.

THOMAS B. KEESLING.

REFERENCES CITED

The following references are of record in the file of this patent:

UNITED STATES PATENTS

| Number | Name | Date |
|---|---|---|
| 1,391,704 | Sturtevant | Sept. 27, 1921 |
| 1,402,487 | Fooks | Jan. 3, 1922 |
| 1,418,572 | Hoyt et al. | June 6, 1922 |
| 1,473,808 | Bretzfelder | Nov. 13, 1923 |
| 1,952,418 | Chapman | Mar. 27, 1934 |
| 2,302,656 | Dray | Nov. 17, 1942 |
| 2,335,588 | Fox | Nov. 30, 1943 |
| 2,355,100 | Nordquist | Aug. 8, 1944 |